United States Patent [19]
Freyre

[11] Patent Number: 5,987,188
[45] Date of Patent: Nov. 16, 1999

[54] SPACE INTEGRATING SLIDING IMAGE OPTICAL CORRELATOR

[75] Inventor: Frederick W. Freyre, Wantagh, N.Y.

[73] Assignee: Northrop Grumman Corporation, Los Angeles, Calif.

[21] Appl. No.: 08/168,406

[22] Filed: Dec. 17, 1993

Related U.S. Application Data

[63] Continuation of application No. 07/929,137, Aug. 13, 1992, abandoned.

[51] Int. Cl.[6] .................................................. G06K 9/74
[52] U.S. Cl. ........................ 382/278; 382/212; 708/816
[58] Field of Search ................................ 382/42, 31, 32, 382/33, 34, 278, 210, 212, 217, 218, 279; 359/561, 107; 364/822

[56] References Cited

U.S. PATENT DOCUMENTS

| | | | |
|---|---|---|---|
| H616 | 4/1989 | Hartman | 350/162.13 |
| 2,795,705 | 6/1957 | Rabinow | 382/212 |
| 3,217,295 | 11/1965 | Bar | 382/212 |
| 3,248,552 | 4/1966 | Bryan | 382/211 |
| 3,413,735 | 12/1968 | Erbert | 382/206 |
| 3,779,492 | 12/1973 | Grumet | 244/3.17 |
| 4,471,445 | 9/1984 | Pernick | 708/821 |
| 4,490,849 | 12/1984 | Grumet et al. | 382/210 |
| 4,559,643 | 12/1985 | Brogardh | 382/212 |
| 4,603,398 | 7/1986 | Bocker et al. | 708/839 |
| 4,669,054 | 5/1987 | Schlunt et al. | 708/816 |
| 4,805,158 | 2/1989 | Fogarty | 708/816 |
| 4,826,285 | 5/1989 | Horner | 708/816 |
| 4,838,644 | 6/1989 | Ochoa et al. | 708/816 |
| 4,843,587 | 6/1989 | Schlunt et al. | 708/816 |
| 4,903,314 | 2/1990 | Fine | 382/210 |
| 4,995,090 | 2/1991 | Singh et al. | 382/213 |
| 5,063,602 | 11/1991 | Peppers et al. | 382/213 |
| 5,131,055 | 7/1992 | Chao | 382/214 |
| 5,150,228 | 9/1992 | Liu et al. | 359/561 |
| 5,323,472 | 6/1994 | Falk | 382/278 |

OTHER PUBLICATIONS

Ittycheriah et al. "An Optical Matrix–Vector Multiplier Project" IEEE Transactions on Education, vol. 34, Iss 4, Nov. 1991, pp. 317–321.

Primary Examiner—Jon Chang
Attorney, Agent, or Firm—Terry J. Anderson; Karl J. Hoch, Jr.

[57] ABSTRACT

An optical correlator includes at least one electrically addressable liquid crystal array, at least one LED array for generating a reference image which is modulated by changing the transmissivity of the liquid crystals in the liquid crystal array, and at least one two-dimensional large size photodiode, the photodiode receiving a modulated image from the liquid crystal array. LED and liquid crystal array are stacked together with a photodiode or an array of photodiodes with no space between, for an exceptionally simple, compact and inexpensive optical correlator structure.

5 Claims, 2 Drawing Sheets

SPACE INTEGRATING SLIDING IMAGE OPTICAL CORRELATOR

This application is a Continuation of application Ser. No. 07/929,137, filed Aug. 13, 1992, now abandoned

BACKGROUND OF THE INVENTION

1. Field of the Invention

This invention relates to an optical correlator.

2. Description of Related Art

Optical correlators are devices which automatically recognize or identify the contents of an image by combining an incoming image with a reference image, the degree of correlation after combining the images determining the intensity of an output light beam, which is detected by a CCD device for subsequent electronic processing. Such correlators currently find application in, or have been proposed for use in, such diverse fields as target recognition and tracking (including drug interdiction by aircraft type recognition), friend/foe determination, machine vision and robotics, pattern recognition (including face and fingerprint recognition), quality control and inspection, statistics collection by item recognition, inventory control, and image deblurring.

The classical Van der Lugt type of optical correlator uses a lens to perform a fourier transform on an incoming two-dimensional image, after which the light beam carrying the transform is caused to pass through an optical matched filter effectively multiplying the transform with a complex conjugate of the transform of a two-dimensional reference image. An inverse transform lens brings the resulting beam to a point or points of focus on a back focal plane of a CCD device for display or further processing, the intensity of the beam at the focal point or points indicating the degree of correlation. Correlators of this type are described in U.S. Pat. No. 3,779,492 to Grumet, and in the article entitled "Digital Analysis of the Effects of Terrain Clutter on the Performance of Matched Filters for Target Identification and Location", published in SPIE Vol. 186 and *Digital Processing of Aerial Images* (1979). Additional discussions concerning matched filtering and related techniques are found in U.S. Pat. No. 4,471,445 to Pernick, U.S. Pat. No. 4,490,849 to Grumet et al., and U.S. Pat. No. 4,838,644 to Ochoa et al.

The Van der Lugt type of optical correlator uses spatial light modulators to impress the incoming image on a coherent light beam for subsequent optical transformation. The electrical output of a camera is impressed upon the coherent light beam by changing the shape of a crystal through which the coherent light passes in response to the electrical output of the camera. The light beam is then transmitted through the transform and matched filter lenses. Conventional spatial light modulators are, however, in general very expensive, slow, and have insufficient image size and/or resolution.

Another category of prior optical correlator, in which the reference image is modulated by the incoming image rather than being applied to a spatial light modulator, is the acousto-optic image correlator. In this type of device, the incoming image is captured by a camera and the electrical output of the camera is used to drive an acousto-optic modulator, also known as a Bragg cell. Two-dimensional reference images in digital electronic memory are used to drive one-dimensional laser diode arrays, and the light from the laser diode arrays is imaged at the Bragg cell and then re-imaged onto a charge-coupled detector (CCD) array.

Both types of prior optical correlators use CCD arrays to capture the correlated or combined image. The CCD arrays need to have thousands of pixels. After attempted correlation, all of the pixel information must be clocked in serial fashion for subsequent electronic processing. This creates a major bottleneck and limits the number of correlations/second to a presently insufficient number, generally in the tens and in a few cases the hundreds of correlations per second. For many applications, correlation rates in the thousands per second are necessary.

In addition, both types of prior optical correlator suffer from large size and lack of mechanical stability, resulting from stringent alignment requirements, the need for focusing lenses and other light guiding elements, and the size and complexity of the respective image combining or light modulating elements used to impress information in electronic form onto a light beam.

The present invention, in contrast, does not require either the Bragg cell, laser diode array, and CCD device of the acousto-optic correlator, nor does it require the spatial light modulator, lenses, and filters of the classical Van der Lugt correlator.

SUMMARY OF THE INVENTION

It is an objective of invention to provide an optical correlator of decreased size and cost.

It is also an objective of the invention to provide an optical correlator of increased stability.

It is a further objective of the invention to provide an optical correlator of increased speed.

It is a still further objective of the invention to provide an optical correlator which is simpler to manufacture and maintain than conventional optical correlators.

It is yet another objective of the invention to provide an optical correlator which does not require laser diode arrays, CCD arrays, spatial light modulators, Bragg cells, transform or other lenses, matched filters, and so forth, as required by prior types of optical correlator.

These and other advantages of the invention are achieved by a space integrating sliding image optical correlator in which the reference image is generated by at least one two-dimensional light emitting diode (LED) array, the incoming image is correlated with the reference image by at least one low cost electrically addressable liquid crystal (LC) array, and the combined image is captured by one or more photodiodes rather than by a CCD array. In an especially preferred embodiment of the invention, the reference image is slid, i.e., caused to change positions or move across the LED array, so as to cause the reference image to overlap the incoming image represented by the on/off states of the liquid crystals in the LC array at some point during the correlation. The preferred correlator therefore does not require expensive types of spatial light modulators, laser diode arrays (which the conventional acousto-optic correlator must use to achieve better speed), CCD arrays, and other optical elements such as the focusing and transform lenses required in Van der Lugt correlators.

The invention achieves a correlation rate of 1000–2000 correlations/second in a relatively small volume. By using several layers of butted component arrays, collimating, imaging, and fourier transform lenses are rendered unnecessary, and the basic optical unit is therefore thin and mechanically stable. The output bottleneck caused by CCD arrays is avoided because the invention is capable of using a relatively small number of photodiodes instead of a large number of CCD pixels to capture the combined image.

The optical correlator of the invention has a wide variety of possible applications, including, but not limited to, machine vision, target recognition and tracking, friend/for determination, fingerprint analysis, character recognition, face recognition, quality control and inspection, statistics collection by item recognition, drug interdiction by aircraft type recognition, and inventory control.

DETAILED DESCRIPTION OF THE INVENTION

Figure 1:
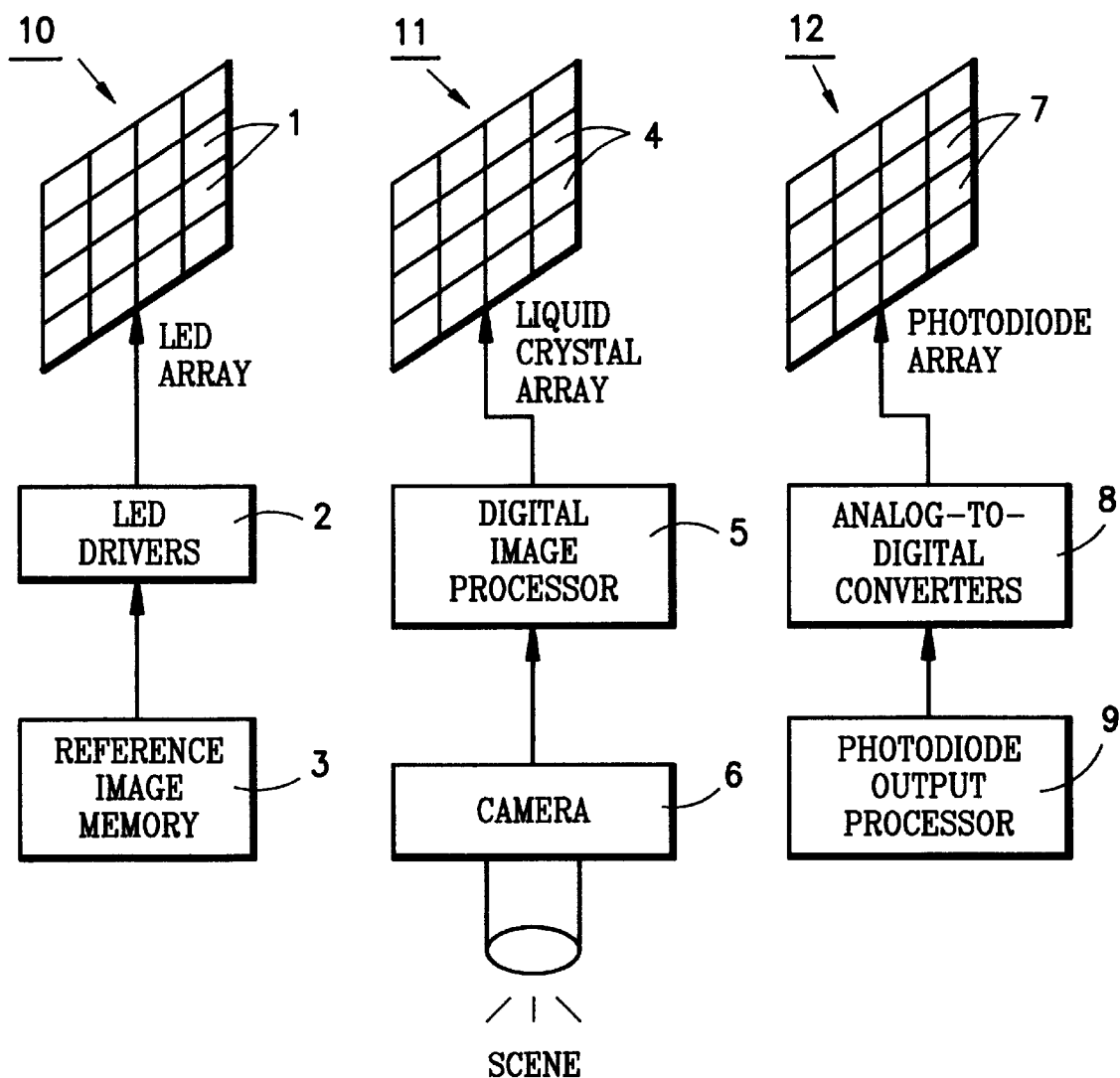
FIG. 1 is an exploded schematic and perspective view of a space integrating sliding image optical correlator constructed in accordance with principles of a preferred embodiment of the invention.

FIG. 1 shows the three principal elements of a preferred space integrating sliding image optical correlator SISIOC embodying the principles of the invention. The inventive optical correlator is formed from three planar arrays which are butted together face-to-face, with no space in between the arrays. The arrays are, however, shown separated for illustrative purposes.

Figure 2:
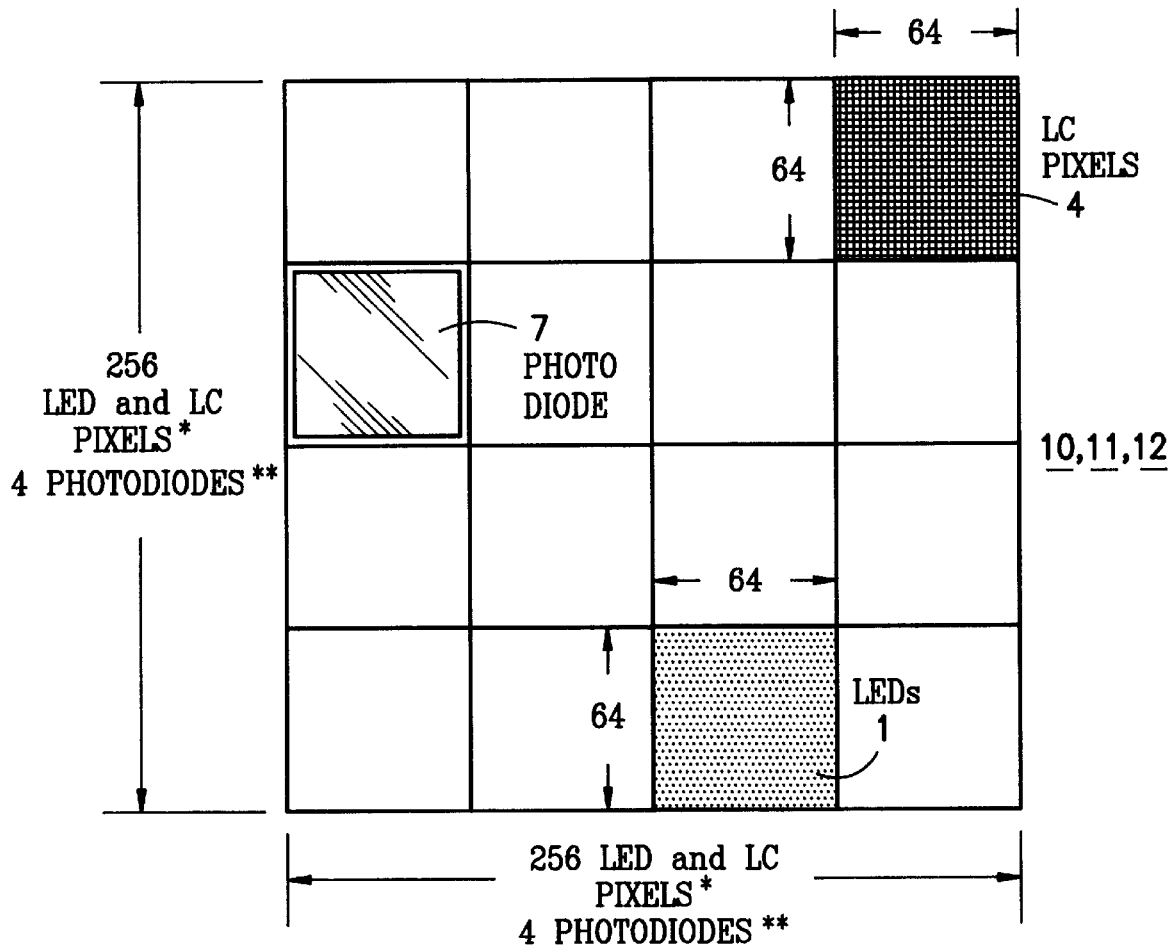
FIG. 2 is a schematic front view of the optical components of the correlator of FIG. 1, with various sub-arrays removed for illustrative purposes.

The arrays shown in FIGS. 1 and 2, consist respectively of 16 64×64 LED and LC pixel sub-arrays, and 16 photodiodes. Only one of each type of sub-array is shown in FIG. 2, with intervening layers of sub-arrays removed where necessary for illustrative purposes. The total size of the exemplary correlator, using conventional, commercially available elements is just 2.3×2.3 inches, and a fraction of an inch thick. Because there is no space between the arrays and no light is lost, no guiding or focusing lenses are required, the light sources do not have to be lasers, and the image capture device can be in the form of a small number of photodiodes in comparison with the number of pixels analyzed.

The first array 10 is an array of light sources preferably made up of 16 64×64 LED sub-arrays 1 which are driven by an LED driver circuit 2. Circuit 2 drives the LEDs based on corresponding addresses of reference images stored in a reference image memory 3. The reference image is preferably an edge enhanced (wire) image provided by a video camera and a digital image processor using well-known conventional image processing and storage techniques. A number of suitable LED drive circuit packages are commercially available.

The second array 11 is an electrically addressed, transmissive, amplitude modulating, liquid crystal (LC) display consisting of 16 64×64 sub-arrays 4 of individually addressable LC display elements. The liquid crystal elements may be turned on and off at typical camera frame rates by a digital image processor circuit 5 which edge enhances an incoming image after conversion of the incoming image to electronic form by a video camera 6. Thus, only those LC pixels at image edge locations are turned on to be transmissive. As a result, the LC array transmits light only where the reference and incoming wire images match each other. Processor circuit 5 may also be used to create the reference images stored in memory 3.

The LEDs are driven in binary (on/off) fashion, as are the liquid crystal pixels. Preferably, there is a one-to-one correspondence between the LED's in sub-array 1 and the liquid crystals in sub-array 4. For best correlation, the LED's and liquid crystal wire images must overlap exactly, which requires that they be of the same scale and orientation, and be located in the same portion of the image field. Positioning of the LED image is accomplished by sliding the image relative to the LCD array 4 in both the X and Y directions by appropriate control of the XY address logic and driver circuit 2, while scaling and orienting the images is preferably accomplished by supplying reference images of different scales and orientations. A variety of simple algorithms may be used to slide the reference image across the LED in any desired pattern, such as by rows or columns, and it is also within the scope of the invention to change the scale and orientation of the reference image solely by control of the XY driver circuit 2 rather than by supplying reference images of different scale and orientation.

Light from the reference image LED array 10 which passes the liquid crystal filter array 11 is captured and integrated by a photodiode 7 in a photodiode array 12. A single photodiode 7 in array 12 overlaps one sub-array of LC pixels 4. Image processing is accomplished by an analog to digital converter 8 and processor 9, both of known type. Variations in LED radiance, liquid crystal (LC) pixel transmissivity, and photodiode responsivity can be compensated for by several known methods, including digital memory and partial (LC) pixel obscuration. Otherwise, determining the correlation is as simple as measuring the voltage output of the photodiodes.

When objects in the camera frame overlap the boundary between two or more sub-groups, the LED reference image must be positioned similarly and therefore the LC transmitted light must be collected by two or more corresponding photodiodes. In this case, the photodiode output processor preferably sums the digitized photodiode outputs in order to measure the correlation.

With current photodiode and LED technology, the photodiodes and LEDs can have a sufficient bandwidth so that the LED reference images can be stepped at 10 Mhz. With 16 sub-groups as previously described and with an object smaller than 64×64 pixels, one set of correlation measurements for a single reference image at one scale and orientation takes less than 1 millisecond. For a larger object, but which is smaller than 128×128 pixels, the time is less than 3 milliseconds.

Although a particularly advantageous embodiment of the above invention has been described with reference to the accompanying drawings, numerous variations of the invention will undoubtedly occur to those skilled in the art, and therefore it is intended that the invention not be limited by the above description or drawings, but rather that it be defined solely in accordance with the appended claims.

I claim:

1. An optical correlator comprising:
    a reference image memory;
    reference image generating means connected to said reference image memory for generating a reference image in optical form, wherein said reference image generating means comprises a two-dimensional array of light emitting diodes and driver means connected to said reference image memory for driving the diodes to selectively turn on diodes corresponding to a reference image retrieved from said reference image memory;
    incoming image capture means for converting an incoming image into electrical signals;
    reference image modulating means electrically connected to said incoming image capture means for optically modulating said reference image by controlling a transparency of said modulating means based on said electrical signals and causing said reference image to be transmitted in optical form through said modulating means, wherein said reference image modulating means comprises a number of liquid crystal elements equal to the number light emitting diodes in said light emitting diode array, and means for causing the transmissivity of individual liquid crystal elements to change in response to input of said captured image; and modulated image capture and integration means for capturing the modulated reference image, integrating the captured image, and converting the integrated captured image into electronic form in order to determine a degree of correlation between the reference image and the incoming image, wherein said modulated image capture and integration means comprises at least one photodiode, and wherein said light emitting diode array forms a first layer of said correlator, said liquid crystal array forms a second layer of said optical correlator, and said modulated image capture and integration means includes a third layer of said optical correlator, said first, second, and third layers being stacked and butted together with no space in between the layers, and wherein the liquid crystal array is positioned between the light emitting diode array and the modulated image capture and integration means.

2. An optical correlator as claimed in claim 1, wherein said incoming image capture means comprises a video camera.

3. An optical correlator as claimed in claim 1, wherein said light emitting diode driver means comprises means for causing said reference image to move across said light emitting diode array in two dimensions.

4. An optical correlator as claimed in claim 1, wherein said modulated image capture and integration means comprises a photodiode for each of said individual liquid crystal elements.

5. An optical correlator as claimed in claim 1, wherein said modulated image capture and integration means comprises a large area photodiode.

* * * * *